March 17, 1931.  G. S. HULL  1,796,602
ROCK BIT CONE
Filed Nov. 26, 1928   2 Sheets-Sheet 1

Inventor
George S. Hull.
By Hartwell Brown
Attorney

March 17, 1931. G. S. HULL 1,796,602
ROCK BIT CONE
Filed Nov. 26, 1928 2 Sheets-Sheet 2
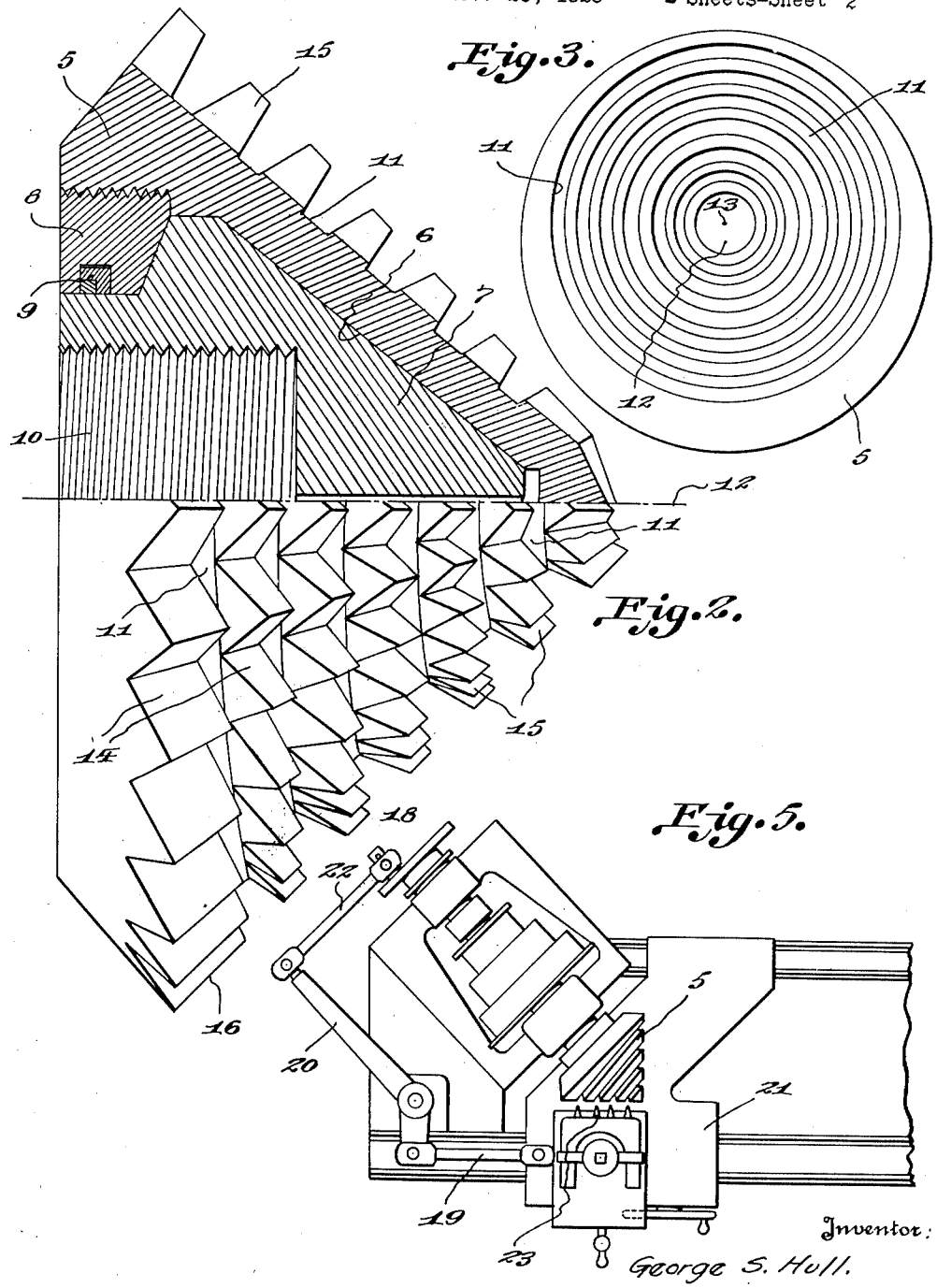

Patented Mar. 17, 1931

1,796,602

UNITED STATES PATENT OFFICE

GEORGE S. HULL, OF TULSA, OKLAHOMA, ASSIGNOR OF ONE-HALF TO GEORGE E. FAILING, OF GARBER, OKLAHOMA

ROCK-BIT CONE

Application filed November 26, 1928. Serial No. 322,057.

This invention relates to rock drills and the improvements are directed to a novel form of cone or cutter for rock bits.

The various objects of my invention can best be understood from the description which follows, and from the accompanying drawings, in which, Figure 1 is a plan view of my improved cone.

Fig. 2 is an elevation thereof, partly in section.

Fig. 3 is a diagrammatic view illustrating the positions of the eccentric grooves.

Fig. 5 is a similar view and for a similar purpose, but illustrating the spindle set at a predetermined angle to the center of a lathe bed.

Figure 1:
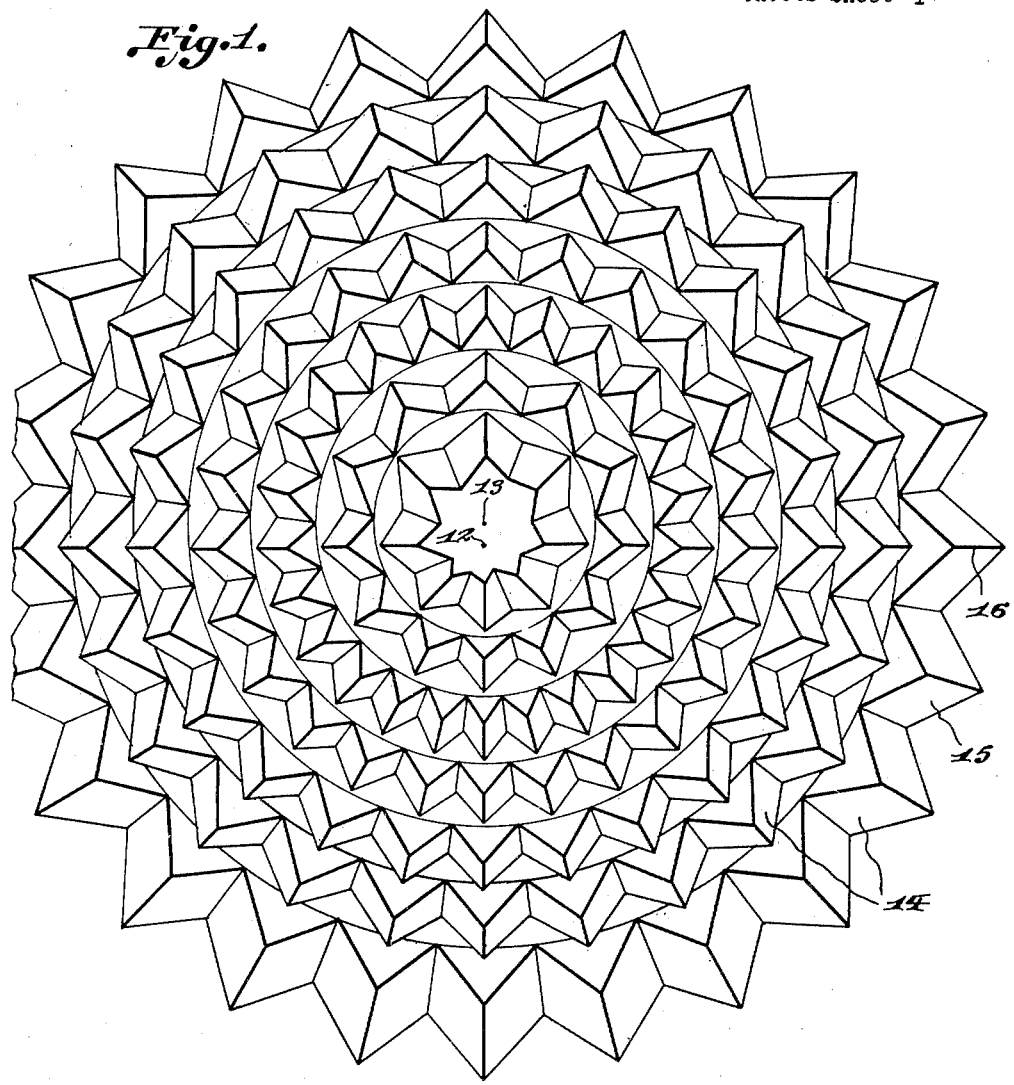

In the present embodiment of the invention, it is proposed to develop a circular groove around a cone at a predetermined angle to the axis or center thereof, each of the grooves being arranged in spaced relation and cooperating with the longitudinal grooves to define a plurality of teeth wherein not more than two teeth in any circular groove are of the same size. In other words, said circular grooves are arranged eccentrically in relation to the normal periphery of the cone itself, and when said cone is rotated on its true center it is obvious that the rows of teeth will not follow each other, or track, and hence move back and forth toward the inside center and outside wall of the hole being drilled. As will become apparent hereinafter, I attain the above result by the provision of the eccentric circular groove aforesaid, which can only be obtained in the present cone by making the same with a different number of teeth, and in view of my construction it is possible to eliminate the present practice of operating the cones in pairs.

Referring now more in particular to the accompanyings drawings, wherein like characters of reference denote similar parts throughout the several views, let 5 indicate generally my improved cone, which is provided with a recess 6, for the reception of the usual bushing 7, the latter being held in assembled relation with respect to said cone by means of a retaining ring 8, a metallic packing 9 being preferably provided. Said bushing or bearing 7 is provided with a threaded bore 10 for the engagement of the stub shaft of a drill head, (not shown).

Figure 4:
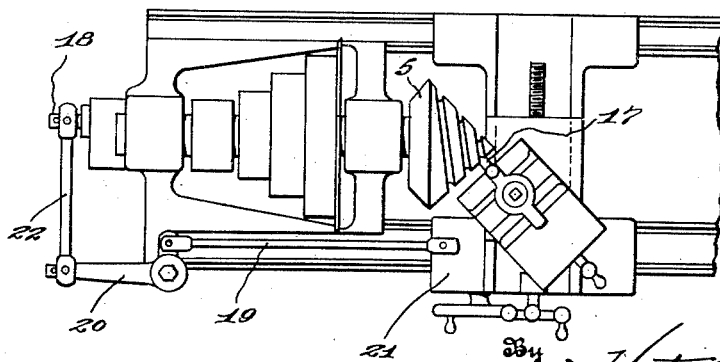
Fig. 4 is a fragmentary view illustrating one of the methods of cutting the grooves.

In Fig. 3 of the drawings is shown the arrangement of the circular grooves 11 with respect to the cone 5, the axis of rotation, or center of the latter being indicated at 12 while the center of the circular grooves is denoted by the numeral 13, said grooves being thus disposed eccentrically of the cone, and at a predetermined angle to the axis of rotation thereof, as will become apparent upon inspection of Figs. 4 and 5. The longitudinal grooves, 14 (see Figs. 1 and 2), radiate or extend from the apex or center 12 of the cone, and these grooves, together with said circular grooves, define the cutting teeth 15.

In the preferred form of these teeth, their cutting edges 15 are substantially equal throughout, considering the first six rows extending from the apex of the cone. The last row, or outer row presents teeth having a variance in the cutting edges thereof, this being due to the angular arrangement of the circular groove which approaches the rear of the cone having a vertical face.

In order to secure relatively large size teeth adjacent the apex of the cone, it is proposed to end the longitudinal grooves 14 at the third row of teeth from the apex of said cone, and thus the first and second row are cut separately and contain a less number of teeth and further the circular grooves are cut slightly deeper, as shown in Fig. 2, to maintain a set of teeth of larger size and strength.

Since the cone is rotated on its center 12, and in view of the eccentric arrangement of the rows of teeth, it is obvious that the revolving of said cone on a fixed pin in the bottom of the hole being drilled prevents the teeth following each other. Thus the teeth move back and forth toward the inside center and outside wall of the hole being drilled.

The method of cutting the grooves is somewhat diagrammatically illustrated in Figs. 4 and 5 wherein it will be observed the cone 5 is mounted on the lathe spindle, and the tool 17 cutting the grooves 11. The other parts of the machine comprise the pin 18 set out of center on a disc on the rear end of the said lathe spindle, a connecting rod 19 being positioned between the bell crank 20 and the carriage 21, the rod 22 joining said crank 20 and pin 18. As shown, said cone is positioned eccentrically of the center of the lathe and the machine is timed so that in the rotation of the cone on its eccentric bushing the carriage is moved horizontally on its track in such a manner as to develop the groove herein shown.

In Fig. 5 the machine has its spindle set at a predetermined angle to the center of the lathe bed. A gang tool 23 is used in this instance, though the action thereof and the cooperative parts are the same as that described hereinbefore.

While the present is a disclosure of the preferred embodiment of the invention, it is to be understood that the same is not limited thereto, as various changes in the minor details of construction, proportion and arrangement of parts may be resorted to without departing from the spirit of the invention as defined in the appended claims.

I claim:

1. A rock bit cone comprising a plurality of teeth formed by circular and longitudinal grooves, said longitudinal grooves extending from the center of said cone and said circular grooves being arranged at a predetermined angle to the axis of said cone and eccentric therewith.

2. A rock bit cone comprising a plurality of teeth having their cutting edges disposed eccentrically of the axis of rotation of said cone to prevent tracking of the rows of teeth.

3. A rock bit cone comprising a plurality of teeth formed by circular and longitudinal grooves, said longitudinal grooves extending from the center of said cone and said circular grooves being arranged at a predetermined angle to the axis of said cone, the cutting edges of the teeth in the outer row varying progressively in width and disposed eccentrically of said axis of rotation.

4. A rock bit cone comprising a plurality of spaced circular grooves arranged eccentrically of the center of said cone, and a plurality of longitudinal grooves radiating from the center of said cone, said grooves defining a plurality of teeth having their cutting edges disposed at varying distances from the axis of rotation of said cone.

In testimony whereof, I affix my signature.

GEORGE S. HULL.